United States Patent
Cho et al.

(10) Patent No.: US 8,842,354 B2
(45) Date of Patent: Sep. 23, 2014

(54) DISPLAY SUBSTRATE, METHOD OF MANUFACTURING THE SAME AND DISPLAY PANEL HAVING THE SAME

(75) Inventors: Hyun-Min Cho, Hwaseong-si (KR); Sung-Sik Yun, Suwon-si (KR); Jae-Byung Park, Seoul (KR); Don-Chan Cho, Seongnam-si (KR); Dae-Hyun Kim, Suwon-si (KR); Seon-Tae Yoon, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 129 days.

(21) Appl. No.: 13/350,922

(22) Filed: Jan. 16, 2012

(65) Prior Publication Data

US 2012/0293852 A1 Nov. 22, 2012

(30) Foreign Application Priority Data

May 19, 2011 (KR) ........................ 10-2011-0047401

(51) Int. Cl.
 *G02B 26/02* (2006.01)
(52) U.S. Cl.
 CPC .................................... *G02B 26/023* (2013.01)
 USPC .......................................... 359/230; 359/228
(58) Field of Classification Search
 CPC .. G02B 26/02; G02B 26/0841; G02B 26/023; G09G 3/3433; G09G 2310/0262
 USPC ................................. 359/227–228, 230, 233
 IPC ... G02B 26/02,26/0841, 26/023; G09G 3/3433, G09G 2310/0262
 See application file for complete search history.

(56) References Cited

U.S. PATENT DOCUMENTS

| 7,742,215 | B2 | 6/2010 | Hagood, IV |
| 7,898,714 | B2* | 3/2011 | Hagood et al. ................ 359/228 |
| 2009/0103164 | A1 | 4/2009 | Fijol et al. |
| 2010/0123947 | A1 | 5/2010 | Cho et al. |
| 2010/0225993 | A1 | 9/2010 | Cho et al. |
| 2013/0050794 | A1* | 2/2013 | Yun et al. ...................... 359/228 |

* cited by examiner

*Primary Examiner* — James Phan
(74) *Attorney, Agent, or Firm* — F. Chau & Associates, LLC

(57) ABSTRACT

A display substrate includes a base substrate, a micro shutter, a first driving electrode, a second driving electrode, and a plurality of anchors. The micro shutter includes a flat portion having at least one opening, a main concave portion adjacent to the opening and extending in from the flat portion to a first depth, and at least one sub-concave portion extending in from a bottom surface of the main concave portion to second depth. The first driving electrode is connected to a first side of the micro shutter. The second driving electrode is connected to a second side of the micro shutter. The second side is positioned opposite to the first side. The anchors fix the first and second driving electrodes on the base substrate.

15 Claims, 13 Drawing Sheets

DISPLAY SUBSTRATE, METHOD OF MANUFACTURING THE SAME AND DISPLAY PANEL HAVING THE SAME

CROSS-REFERENCE TO RELATED APPLICATION

This application claims priority under 35 U.S.C. §119 to Korean Patent Application No. 2011-47401, filed on May 19, 2011, in the Korean Intellectual Property Office (KIPO), the contents of which are herein incorporated by reference in their entireties.

BACKGROUND OF THE INVENTION

1. Technical Field

Example embodiments of the present invention relate to a display substrate, a method of manufacturing the display substrate and a display panel having the display substrate. More particularly, example embodiments of the present invention relate to a display substrate having a digital micro shutter (DMS), a method of manufacturing the display substrate and a display panel having the display substrate.

2. Discussion of the Related Art

Generally, a display apparatus displays an image or data inputted by an input device. For example, a cathode ray tube, a liquid crystal display (LCD), a plasma display panel (PDP) and a field emission display have been used for the display apparatus.

Studies on applying a different mode for a display apparatus have been performed. An organic light emitting display (OLED) a successor to the LCD and the PDP, is a next generation display apparatus, which has begun to be commercialized. In addition, a display apparatus using a micro electro-mechanical system (MEMS), which has relatively high efficiency for light utilization and relatively fast switching, has been developed.

The display apparatus using the MEMS includes a first substrate on which a light blocking layer having at least one opening is formed, a digital micro shutter (DMS) having at least one opening, and a second substrate having a circuit which controls opening and closing of the DMS. The DMS moves horizontally by an electrostatic force when an electric signal is applied from the circuit. For example, when an electric signal is applied to the DMS from the circuit, the DMS moves horizontally by the electrostatic force, so that the opening of the DMS is aligned with the opening of the light blocking layer and thus light passes through the openings. When the electric signal is not applied to the DMS, the DMS moves horizontally by an elastic force, such as a spring force, so that the opening of the DMS is not aligned with the opening of the light blocking layer and thus the light is blocked.

The DMS is spaced apart from a backplane on which the circuit is formed in a vertical direction, so that the DMS is able to move horizontally without interference.

However, a static friction occurs due to a molecular force of molecules on a contact surface between the DMS and the backplane. As a result, the second substrate may be damaged and a yield of manufacturing the display apparatus may be decreased.

SUMMARY OF THE INVENTION

Example embodiments of the present invention provide a display substrate capable of deceasing damage due to static friction, a method of manufacturing the display substrate, and a display panel having the display substrate.

According to an example embodiment of the present invention, a display substrate includes a base substrate, a micro shutter, a first driving electrode, a second driving electrode, and a plurality of anchors. The micro shutter includes a flat portion having at least one opening, a main concave portion adjacent to the opening and extending in from the flat portion to a first depth, and at least one sub-concave portion extending in from a bottom surface of the main concave portion to a second depth. The first driving electrode is connected to a first side of the micro shutter. The second driving electrode is connected to a second side of the micro shutter. The second side is positioned opposite to the first side. The anchors fix the first and second driving electrodes on the base substrate.

In an example embodiment, the display substrate may further include a first reference electrode and a second reference electrode. The first reference electrode may be spaced apart from the first driving electrode, and fixed on the base substrate by at least one of the anchors. The second reference electrode may be spaced apart from the second driving electrode, and fixed on the base substrate by at least one of the anchors.

In an example embodiment, the micro shutter may include a plurality of sub-concave portions. Depths of the sub-concave portions extending in from the bottom surface of the main concave portion may be different from each other.

In an example embodiment, the sub-concave portions may be symmetrically formed with respect to a central axis of the micro shutter.

In an example embodiment, the sub-concave portions may be asymmetrically formed with respect to a central axis of the micro shutter.

In an example embodiment, the sub-concave portions may be formed adjacent to a central axis of the micro shutter.

In an example embodiment, the sub-concave portions may be formed at first and second sides of the micro shutter to which the first and second driving electrodes are connected.

In an example embodiment, the sub-concave portion may have a cone shape or a quadrangular pyramid shape.

In an example embodiment, the display substrate further includes a circuit part disposed on the base substrate and providing a driving signal to the first and second driving electrodes.

In an example embodiment, the circuit part may include a storage capacitor including at least one electrode. The electrode may be formed corresponding to an area where the micro shutter is disposed and be substantially parallel with the opening.

According to another example embodiment of the present invention, a method of manufacturing a display substrate includes forming a first sacrificial layer on a base substrate, and forming an anchor hole and a sub-hole having a depth smaller than that of the anchor hole in the first sacrificial layer. A second sacrificial layer is formed on the first sacrificial layer. In the second sacrificial layer, an electrode hole overlaps with the anchor hole and a main hole overlaps with the sub-hole. A metal layer is formed on the second sacrificial layer. The metal layer is patterned to form a micro shutter and a first driving electrode. The micro shutter includes a flat portion having at least one opening, a main concave portion adjacent to the opening and extending in from the flat portion to a first depth, and at least one sub-concave portion extending in from a bottom surface of the main concave portion to a second depth. The first driving electrode is connected to a first side of the micro shutter. The first and second sacrificial layers are removed.

In an example embodiment, forming a first sacrificial layer may further include forming a plurality of sub-holes having smaller depths than the depth of the anchor hole. Depths of the sub-holes may be different from each other.

In an example embodiment, the metal layer may include an amorphous silicon layer and an aluminum layer.

In an example embodiment, before forming the first sacrificial layer, the method of manufacturing a display substrate may further include forming a semiconductor pattern on the base substrate, forming a first conductive pattern on the base substrate including the semiconductor pattern, and forming a second conductive pattern on the base substrate including the first conductive pattern is formed. The first conductive pattern may overlap with the semiconductor pattern. The second conductive pattern may electrically contact the semiconductor pattern and/or the first conductive pattern through a contact hole.

In an example embodiment, the first conductive pattern may include at least one first electrode of a storage capacitor. The first electrode may be disposed on the base substrate to correspond to an area where the micro shutter is disposed and may be substantially parallel with the opening. The second conductive pattern may include a second electrode of the storage capacitor overlapping the first electrode.

According to another example embodiment of the present invention, a display panel includes a first display substrate, a second display substrate and a fluidic layer disposed between the first and second display substrates. The first display substrate includes a first base substrate, a micro shutter including a flat portion having at least one opening, a main concave portion adjacent to the opening and extending in from the flat portion to a first depth, and at least one sub-concave portion extending in from a bottom surface of the main concave portion to a second depth, a first driving electrode connected to a first side of the micro shutter, a second driving electrode connected to a second side of the micro shutter, the second side positioned opposite to the first side, and a plurality of anchors fixing the first and second driving electrodes on the base substrate. The second display substrate includes a second base substrate facing the first base substrate, and a reflecting layer formed on the second base substrate and having at least one transmitting hole corresponding to an area where the micro shutter is formed.

In an example embodiment, the micro shutter may include a plurality of sub-concave portions. Depths of the sub-concave portions extending in from the bottom surface of the main concave portion may be different from each other.

In an example embodiment, the display panel may further include a circuit part disposed on the first base substrate and providing a driving signal to the first and second driving electrodes.

In an example embodiment, the circuit part may include a storage capacitor including at least one electrode. The electrode may be formed corresponding to an area where the micro shutter is disposed and be substantially parallel with the opening.

In an example embodiment, the electrode of the storage capacitor may overlap with the reflecting layer.

According to another example embodiment of the present invention, a display substrate includes a base substrate and a micro shutter comprising a flat portion having at least one opening, a plurality of main concave portions extending in from the flat portion to a first depth, and a plurality of sub-concave portions extending in from a bottom surface of the main concave portion to a plurality of second depths, wherein the plurality of second depths are different from each other.

According to the example embodiments, a plurality of sub-concave portions having depths different from each other are Ruined on the micro shutter, so that a static friction between the base substrate and the micro shutter spaced apart and floated from the base substrate may be decreased.

BRIEF DESCRIPTION OF THE DRAWINGS

The above and other features of the present invention will become more apparent by describing in detail example embodiments thereof with reference to the accompanying drawings, in which.

DETAILED DESCRIPTION OF EXAMPLE EMBODIMENTS

Hereinafter, embodiments of the present invention will be explained in detail with reference to the accompanying drawings.

Figure 1:
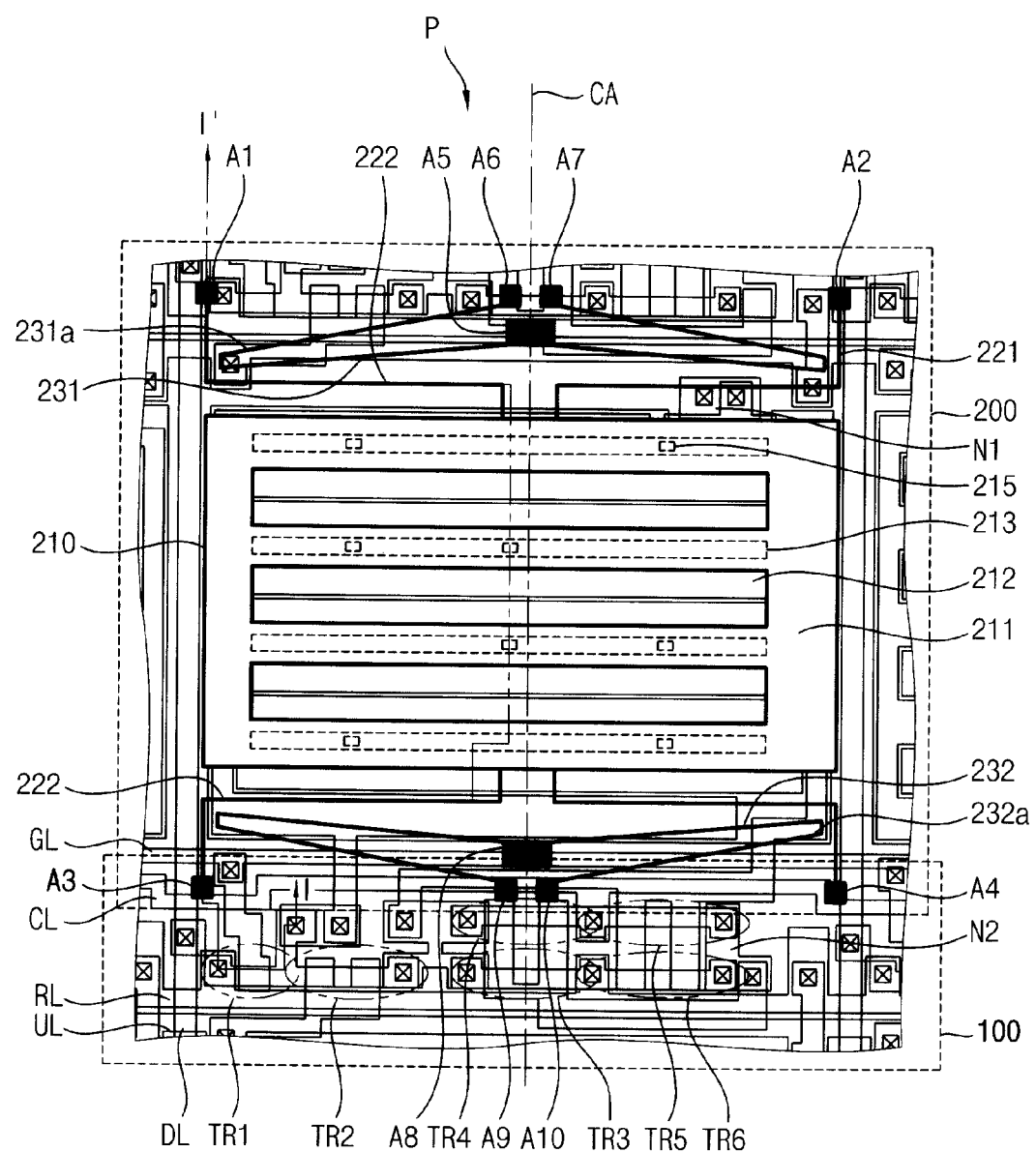
FIG. 1 is a plan view illustrating a portion of a display panel according to an example embodiment of the present invention.

FIG. 1 is a plan view illustrating a portion of a display panel according to an example embodiment of the present invention.

Referring to FIG. 1, the display panel includes a plurality of pixels, and each pixel P includes a circuit part 100 and a shutter part 200.

Figure 2:
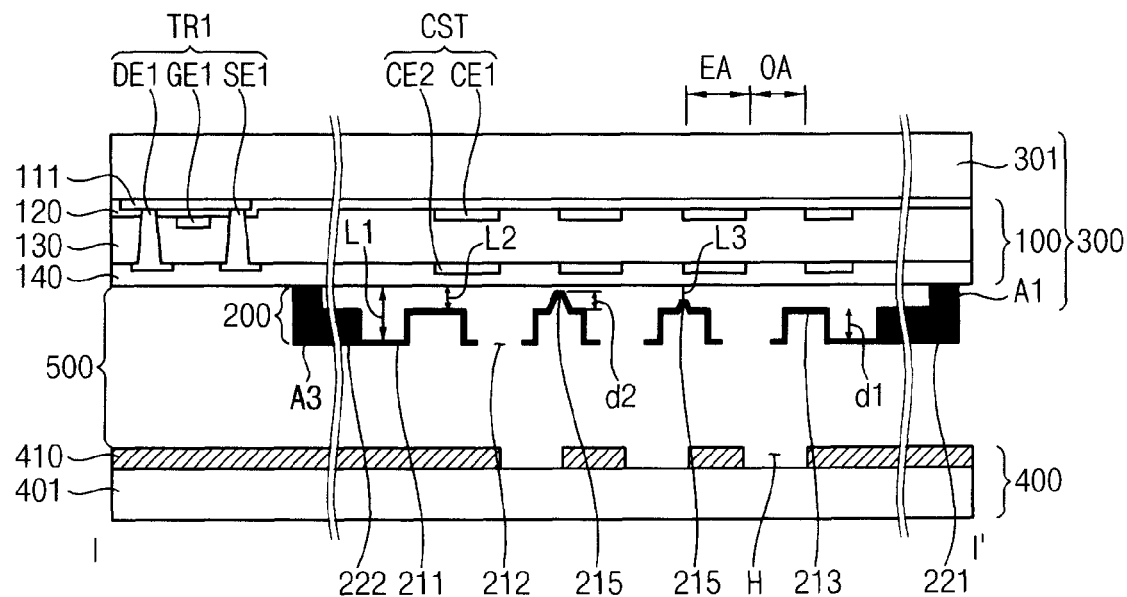
FIG. 2 is a cross-sectional view taken along a line I-I' of FIG. 1.

The circuit part 100 includes a plurality of signal lines DL, GL, CL, RL and UL, a plurality of transistors TR1, TR2, TR3, TR4, TR5 and TR6, and a storage capacitor CST (see FIG. 2). The circuit part 100 is electrically connected to the shutter part 200 to control the shutter part 200.

The shutter part 200 includes a micro shutter 210, a plurality of driving electrodes 221 and 222, a plurality of reference electrodes 231 and 232, and a plurality of anchors A1, A2, . . . , A10.

The micro shutter 210 includes a flat portion 211, at least one opening 212 formed on the flat portion 211, and a main-concave portion 213. The opening 212 extends along a second direction D2 crossing a first direction D1 along which the micro shutter 210 moves. The main-concave portion 213 is formed adjacent to the opening 212, and extends along the second direction D2. The main-concave portion 213 has a first depth d1 from the flat portion 211. The main-concave portion 213 prevents the micro shutter 210 from being bent. A main-concave portion 213 may be formed at one side of an opening 212, or at two sides of an opening 212.

According to an embodiment, one or more of the main-concave portions 213 includes at least one sub-concave portion 215. The sub-concave portion 215 is extended to a second depth (e.g., depth d2) from a bottom surface of the main-concave portion 213. According to an embodiment, the micro shutter 210 includes a plurality of sub-concave portions 215. Depths of the sub-concave portions 215 from the bottom surface of the main-concave portion 213 may be different from each other. According to embodiments, the sub-concave portions 215 have a cone shape or a quadrangular pyramid shape. The sub-concave portion 215 decreases a static friction at the main-concave portion 213.

The driving electrodes includes a first driving electrode 221 connected to a first side of the micro shutter 210, and a second driving electrode 222 connected to a second side of the micro shutter opposite to the first side. According to an embodiment, each of the first and second driving electrodes 221 and 222 has a symmetrical Y-shape with respect to a central axis CA of the micro shutter 210.

The reference electrodes include a first reference electrode 231 spaced apart from the first driving electrode 221 and a second reference electrode 232 spaced apart from the second driving electrode 222. According to an embodiment, each of the first and second reference electrodes 231 and 232 has a symmetrical V-shape with respect to the central axis CA. The first reference electrode 231 includes a first extending electrode 231a which is connected to the first reference electrode 231 and substantially parallel with the first reference electrode 231. The second reference electrode 232 includes a second extending electrode 232a which is connected to the second reference electrode 232 and substantially parallel with the second reference electrode 232. The first and second extending electrodes 231a and 232a reinforce the first and second reference electrodes 231 and 232 against an elastic force.

The anchors A1, A2, ..., A10 fix the first driving electrode 221, the second driving electrode 222, the first reference electrode 231 and the second reference electrode 232. Each of the anchors A1, A2, ..., A10 has a height.

The first and second anchors A1 and A2 fix end portions of the first driving electrode 221, and apply a driving voltage to the first driving electrode 221. The third and fourth anchors A3 and A4 fix end portions of the second driving electrode 222, and apply a driving voltage to the second driving electrode 222.

The fifth anchor A5 fixes the first reference electrode 231, and applies a reference voltage to the first reference electrode 231. The sixth and seventh anchors A6 and A7 fix end portions of the first extending electrode 231a. A reference voltage is applied to the sixth and seventh anchors A6 and A7. The eighth anchor A8 fixes the second reference electrode 232, and applies a reference voltage to the second reference electrode 232. The ninth and tenth anchors A9 and A10 fix end portions of the second extending electrode 232a. A reference voltage is applied to the ninth and tenth anchors A9 and A10.

Figure 3:
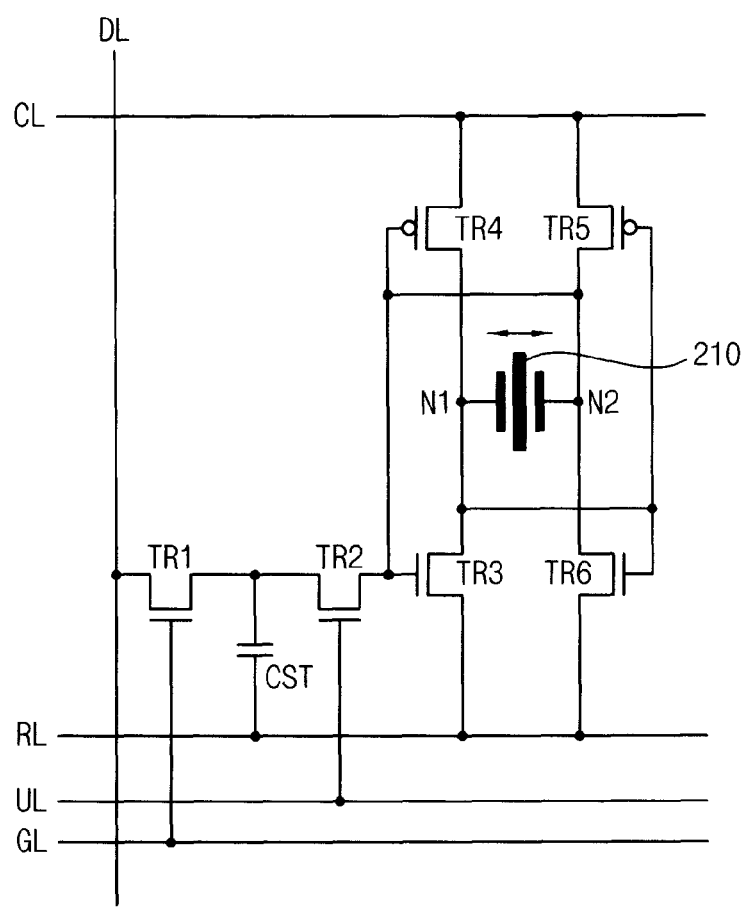
FIG. 3 is an equivalent circuit diagram illustrating a circuit part of FIG. 1.

FIG. 2 is a cross-sectional view taken along a line I-I' of FIG. 1. FIG. 3 is an equivalent circuit diagram illustrating a circuit part of FIG. 1.

Referring to FIGS. 1 and 2, the display panel includes a first display substrate 300, a second substrate 400 and a fluidic layer 500.

The first display substrate 300 includes a first base substrate 301, the circuit part 100 formed on the first base substrate 301, and the shutter part 200 formed on the circuit part 100.

The circuit part 100 includes the plurality of signal lines DL, GL, CL, UL and RL, the plurality of transistors TR1, TR2, TR3, TR4, TR5 and TR6, the storage capacitor CST, a first node N1 and a second node N2.

For example, referring to FIG. 3, a first transistor TR1 is connected to a gate line GL, a data line DL and a second transistor TR2. The second transistor TR2 is connected to an up-data line UL, the first transistor TR1 and a third transistor TR3. The third transistor TR3 is connected to the second transistor TR2, a reference line RL and the first node N1. The fourth transistor TR4 is connected to the second transistor TR2, a control line CL, and the first node N1. The fifth transistor TR5 is connected to the third transistor TR3, the control line CL, and the second node N2. The sixth transistor TR6 is connected to the third transistor TR3, the reference line RL, and the second node N2. According to an embodiment, each of the first, second, third and sixth transistors TR1, TR2, TR3 and TR6 is an N-type transistor, and each of the firth and fifth transistors TR4 and TR5 is a P-type transistor. Alternatively, the doping of the transistors may be reversed.

Each of the first to sixth transistors TR1, TR2, TR3, TR4, TR5 and TR6 includes a semiconductor 111, a gate electrode GE1 formed on the semiconductor 111, a source electrode SE1 connected to the semiconductor 111 and a drain electrode DE1 connected to the semiconductor 111.

The storage capacitor CST includes a first electrode CE1 connected to the first transistor TR1, and a second electrode CE2 connected to the reference line RL. For example, the storage capacitor CST is disposed to overlap an area where the micro shutter 210 is formed, and includes a plurality of first electrodes CE1 connected in parallel and a plurality of second electrodes CE2 overlapping with the first electrodes CE1.

The first node N1 is electrically connected to the first driving electrode 221 of the shutter part 200. The second node N2 is electrically connected to the second electrode 222 of the shutter part 200. In addition, the reference line RL is electrically connected to the first reference electrode 231 of the shutter part 200 and the second reference electrode 232 of the shutter part 200.

In addition, with reference to the transistors, the circuit part 100 further includes a first insulation layer 120 formed between the semiconductor 111 and the gate electrodes GE, a second insulation layer 130 formed between the gate electrodes GE and the source electrodes SE, and a third insulation layer 140 formed on the source electrodes SE.

The shutter part 200 is disposed on the first base substrate 301 on which the circuit part 100 is formed. The shutter part 200 includes the anchors A1, A2, ..., A10, and the first driving electrode 221 connected to the anchors A1 and A2, the second driving electrode 222 connected to the anchors A3 and A4, the first reference electrode 231 connected to the anchors A5, A6 and A7, and the second reference electrode 232 connected to the anchors A8, A9 and A10. The shutter part 200 includes the micro shutter 210 connected to the first and second driving electrodes 221 and 222.

Each of the anchors A1, A2, ..., A10 is formed on the first base substrate 301 on which the circuit part 100 is formed, and has a height corresponding to a first length L1. The first driving electrode 221, the second driving electrode 222, the first reference electrode 231 and the second reference electrode 232 are connected to the anchors A1, A2, ..., A10, and spaced apart from the first base substrate 301 on which the circuit part 100 is formed by a second length L2.

The micro shutter 210 includes the flat portion 211, the opening 212, the main-concave portion 213 and the sub-concave portion 215. The flat portion 211 is spaced apart from the first base substrate 301 on which the circuit part 100 is formed by the first length L1. The flat portion 211 is partially removed to form the opening 212. For example, the opening 212 partially overlaps with a first area EA where the storage capacitor CST is formed, and partially overlaps with a second area OA where the storage capacitor CST is not formed.

The bottom surface of the main-concave portion 213 is spaced apart from the first base substrate 301 on which the circuit part 100 is formed by the second length L2. A bottom surface of the sub-concave portion 215 is spaced apart from the first base substrate 301 on which the circuit part 100 is formed by the third length L3. In addition, the main-concave portion 213 extends in from the flat portion 211 by a first depth d1. The sub-concave portion 215 extends in from the bottom surface of the main-concave portion 213 by a second depth d2. According to an embodiment, the second depth is smaller than the first depth d1.

The micro shutter 210 includes a plurality of the sub-concave portions 215. According to an embodiment, the bottom surface of each of the sub-concave portions 215 is spaced apart from the first base substrate 301 on which the circuit part 100 is formed by lengths different from each other. The sub-concave portions 215 decrease static friction between the micro shutter 210 and the circuit part 100.

The second display substrate 400 includes a second base substrate 401 and a reflecting layer 410 formed on the second base substrate 401.

The reflecting layer 410 has at least one transmitting hole H. The transmitting hole(s) H is formed in an area of the second base substrate 401 corresponding to an area in which the micro shutter 210 is formed. For example, according to an embodiment, the transmitting hole H is formed on the second base substrate 401 corresponding to the second area OA where the storage capacitor CST is not formed. The reflecting layer 410 reflects light which does not pass through the transmitting hole H of the second base substrate 401 back toward the first display substrate 300 so that the light might be reused for transmission through the transmitting hole H. Thus, the reflecting layer 410 improves efficiency by providing light back to the first display substrate 300.

Figure 4A:
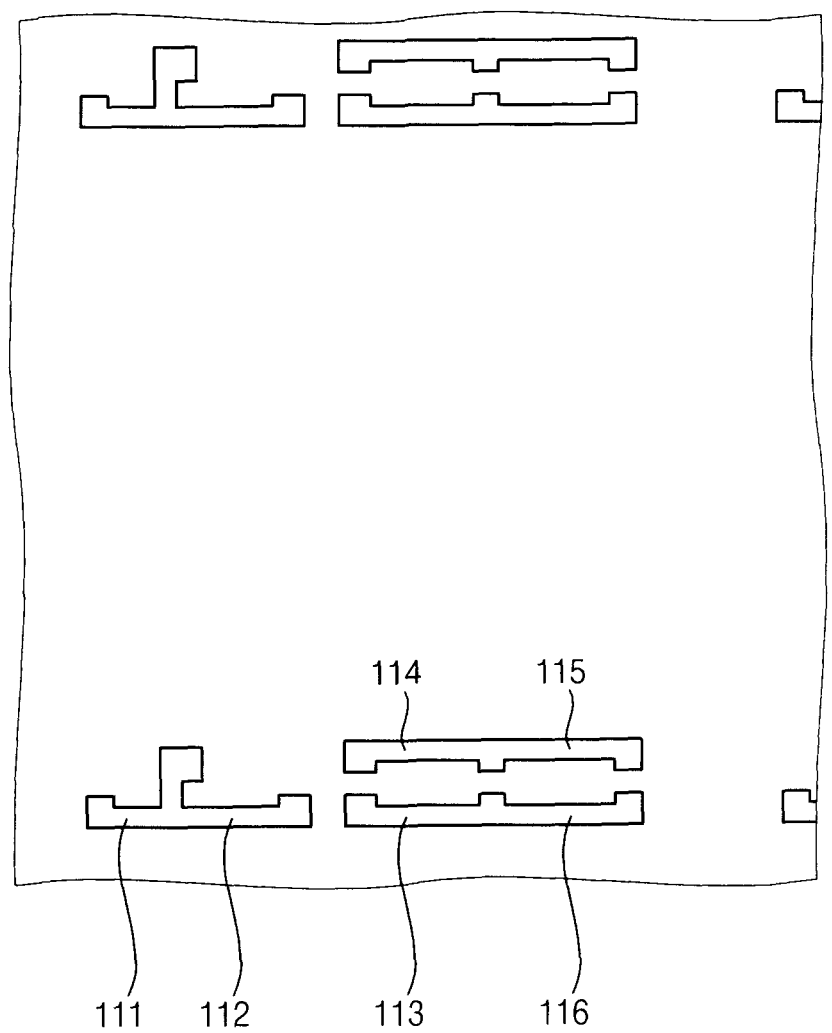
FIGS. 4A to 4C are plan views to explain a method for manufacturing the circuit part of FIG. 1.
Figure 4B:
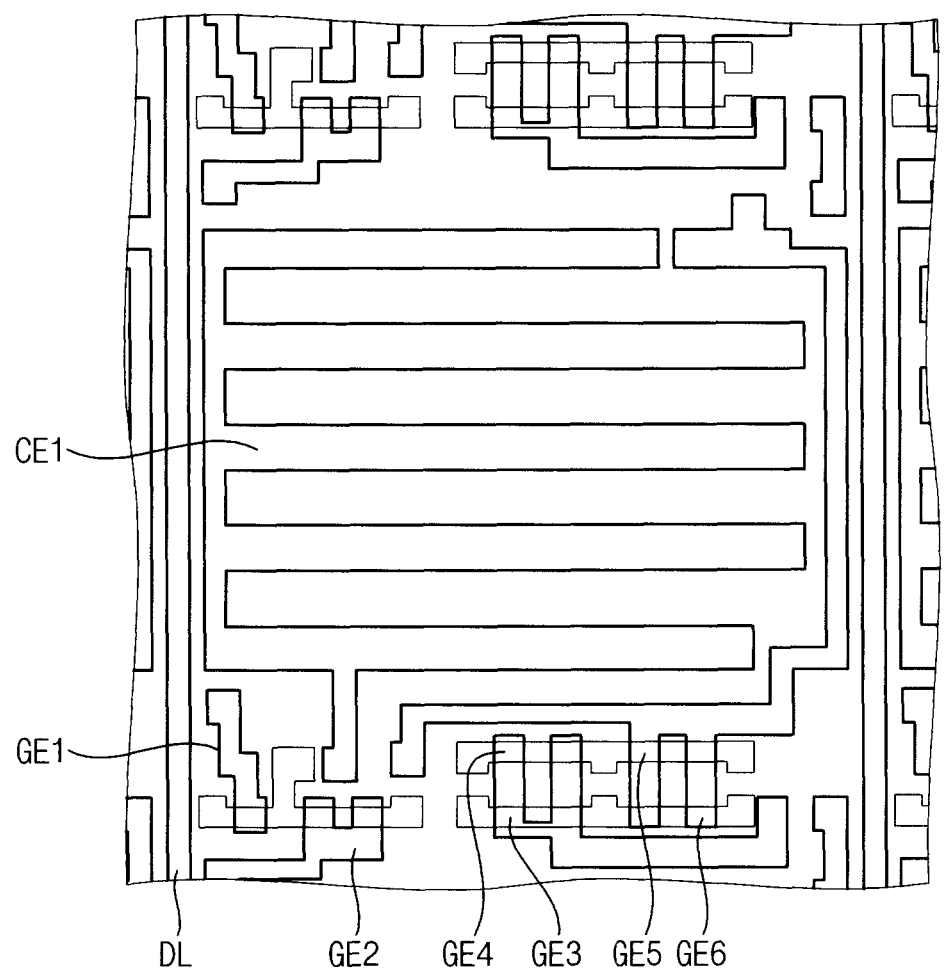
Figure 4C:
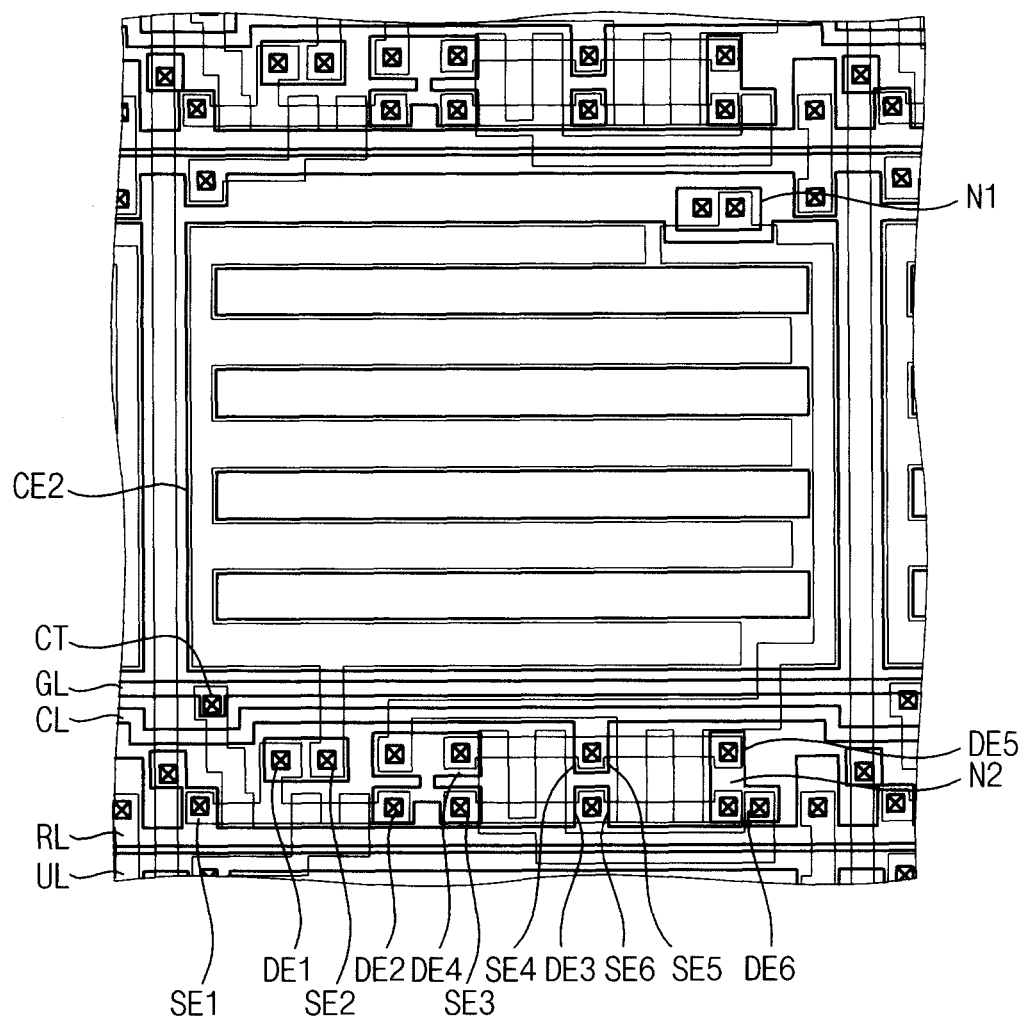

FIGS. 4A to 4C are plan views to explain a method for manufacturing the circuit part of FIG. 1.

Referring to FIGS. 2 and 4A, a semiconductor pattern is formed on the first base substrate. The semiconductor pattern includes a first semiconductor 111, a second semiconductor 112, a third semiconductor 113, a fourth semiconductor 114, a fifth semiconductor 115, and a sixth semiconductor 116. A insulation layer 120 is formed on the first base substrate 301 including the first to sixth semiconductors 111, 112, 113, 114, 115 and 116.

Referring to FIGS. 2 and 4B, a first conductive pattern is formed on the second insulation layer 120. The first conductive pattern includes a data line DL, a first capacitor electrode CE1, gate electrodes GE1, GE2, GE3, GE4, GE5 and GE6. A second insulation layer 130 is formed on the first base substrate 301 including the first conductive pattern.

Referring to FIGS. 2 and 4C, a plurality of contact holes CT is formed by patterning the first and second insulation layers 120 and 130. A second conductive pattern is formed on the first base substrate 301. The second conductive pattern includes a gate line GL, a control line CL, a reference line RL, a up-data line UL, source electrodes SE1, SE2, SE3, SE4, SE5 and SE6, and drain electrodes DE1, DE2, DE3, DE4, DE5 and DE6. The second conductive pattern makes contact with the semiconductor pattern or the first conductive pattern through the contact holes CT. A third insulation layer 140 is formed on the first base substrate 301 including the second conductive pattern.

Although not shown in figures, a shielding pattern may be formed on the first base substrate 301 including the third insulation layer 140. According to an embodiment, the shielding pattern is formed on the third insulation layer 140 of the first base-substrate corresponding to an area where the first and second reference electrodes 231 and 232 of the shutter part 200 are formed. The shielding pattern prevents an electrical signal from being provided to the first and second reference electrodes 231 and 232. The electrical signal is applied to the signal lines and electrodes of the circuit part 100 formed under the first and second reference electrodes 231 and 232.

Figure 5A:
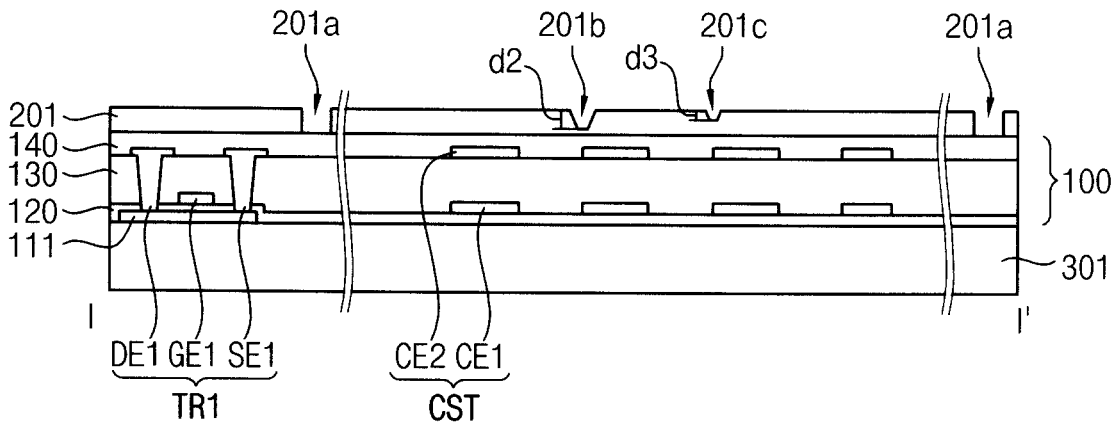
FIGS. 5A to 5C are cross-sectional views to explain a method for manufacturing a shutter part of FIG. 1.
Figure 5B:
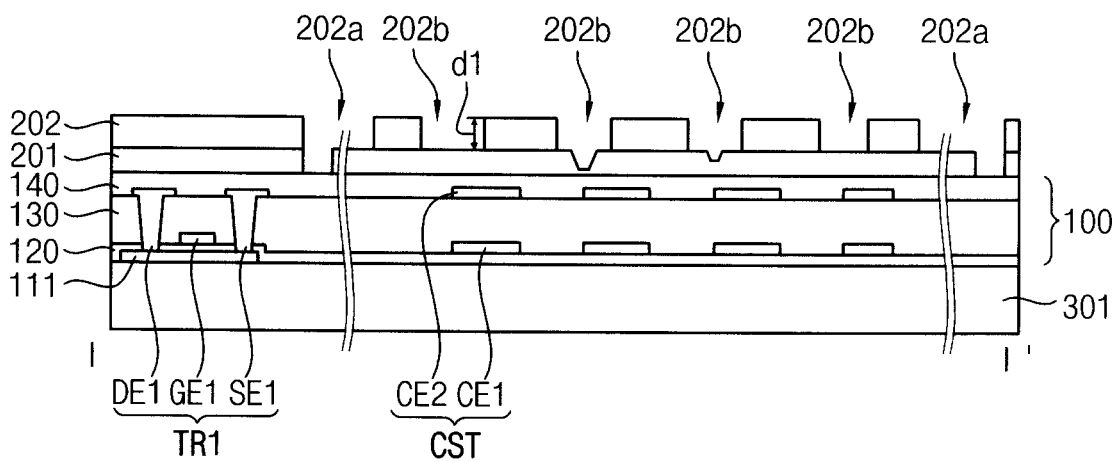
Figure 5C:
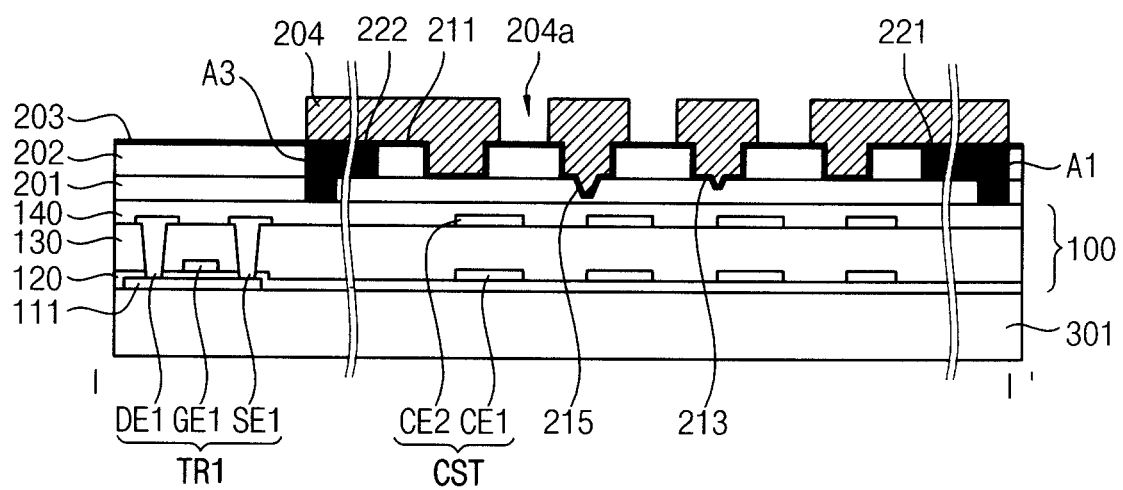

FIGS. 5A to 5C are cross-sectional views to explain a method for manufacturing a shutter part of FIG. 1.

Referring to FIGS. 2, 4C and 5A, a first sacrificial layer 201 is formed on the first base substrate 301 on which the circuit part 100 is formed. An anchor hole 201a and sub-holes 201b and 201c having second and third depths d2 and d3 different from each other are formed by patterning the first sacrificial layer 201. The anchor holes 201a are formed in areas where the anchors A1, A2, . . . , A10 are formed. The sub-holes 201b and 201c are formed in areas where the sub-concave portions 215 are formed.

Referring to FIGS. 2, 5A and 5B, a second sacrificial layer 202 is formed on the first base substrate 301 including the first sacrificial layer 201. Electrode holes 202a and the main holes 202b are formed by patterning the second sacrificial layer 202. The electrode holes 202a overlap with the respective anchor holes 201a, and are formed in areas where the driving electrodes 221 and 222 and the reference electrodes 231 and 232 are formed. The main holes 202b overlap with the sub-holes 201b and 201c, and are formed in areas where the main-concave portions 213 are formed. Each of the electrode holes 202a and the main holes 202b has a first depth d1. According to an embodiment, the first depth d1 is lager than the second depth d2.

Referring to FIGS. 2, 5B and 5C, a metal layer 203 is formed on the first base substrate 301 including the second sacrificial layer 202. The metal layer 203 includes, for example, an amorphous silicon layer and an aluminum layer.

The metal layer 203 fills in and/or lines the anchor hole 201a, the sub-holes 201b and 201c, the electrode holes 202a, and the main holes 202b formed on the first and second sacrificial layers 201 and 202, to form the anchors A1, A2, . . . , A10, the driving electrodes 221 and 222, the reference electrodes 231 and 232, the main concave portions 213 and the sub-concave portions 215. In addition, the metal layer 203 is formed on a flat surface of the second sacrificial layer 202, so that a flat portion 211 of the micro shutter is formed.

A photo mask pattern 204 is formed on the first base substrate 301 including portions of the metal layer 203. The photo mask pattern 204 is formed in the shutter part 200, and formed on the second sacrificial layer 202. The photo mask pattern 204 includes a hole pattern 204a formed areas corresponding to the openings 212 of the micro shutter 210. The metal layer 203 is patterned using the photo mask pattern 204. Thus, the metal layer 203 is patterned into the shutter part 200 having the openings 212.

Then, the first sacrificial layer 201, the second sacrificial layer 202 and the photo mask pattern 204 are removed. The micro shutter 210, the driving electrodes 221 and 222 connected to the micro shutter 210, and the reference electrodes 231 and 232 facing the driving electrodes 221 and 222 are formed on the circuit part 100. The shutter part 200, including the micro shutter 210, is fixed by the anchors A1, A2, . . . , A10, so that the shutter part 200, including the micro shutter 210, is spaced apart and floated from the first base substrate 301. Thus, the shutter part 200 is formed on the first base substrate 301 on which the circuit part 100 is formed.

Then, according to an embodiment, an insulation layer (not shown) is formed on the first base substrate 301 on which the shutter part 200 is formed.

FIGS. 6A to 6D are plan views to explain a distribution of sub-concave portions according to another example embodiment of the present invention.

Figure 6A:
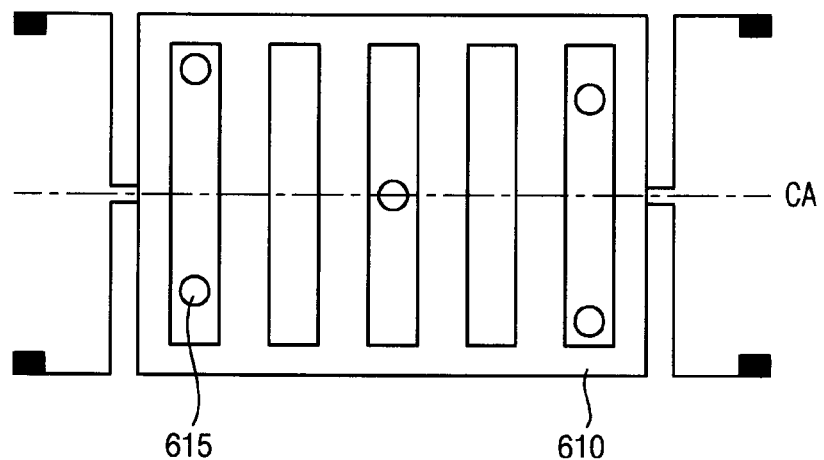
FIGS. 6A to 6D are plan views to explain a distribution of sub-concave portions according to another example embodiment of the present invention.

Referring to FIG. 6A, a micro shutter 610 includes a plurality of sub-concave portion 615. The sub-concave portions 615 are asymmetrically disposed with respect to a central axis CA of the micro shutter 610. Depths of the sub-concave portions 615 are different from each other. Each of the sub-concave portions 615 has, for example, a cone shape or a quadrangular pyramid shape.

Figure 6B:
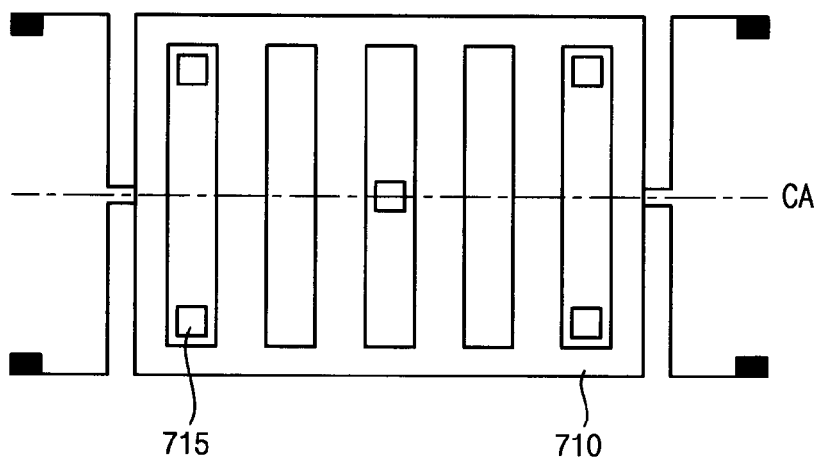

Referring to FIG. 6B, a micro shutter 710 includes a plurality of sub-concave portions 715. The sub-concave portions 715 are symmetrically disposed with respect to a central axis CA of the micro shutter 710. Depths of the sub-concave portions 715 are different from each other. Each of the sub-concave portions 715 has, for example, a cone shape or a quadrangular pyramid shape.

Figure 6C:
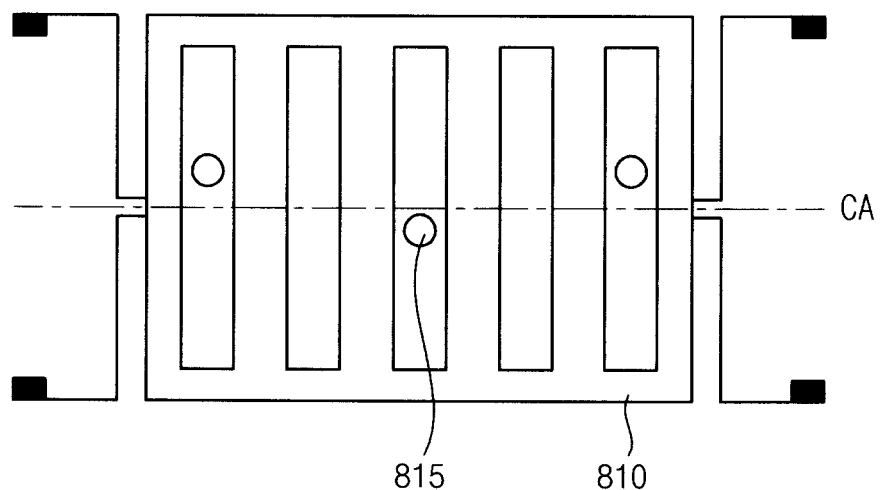

Referring to FIG. 6C, a micro shutter 810 includes a plurality of sub-concave portions 815. The sub-concave portions 815 are disposed adjacent to a central axis CA of the micro shutter 810. Depths of the sub-concave portions 815 are different from each other. Each of the sub-concave portions 815 has, for example, a cone shape or a quadrangular pyramid shape.

Figure 6D:
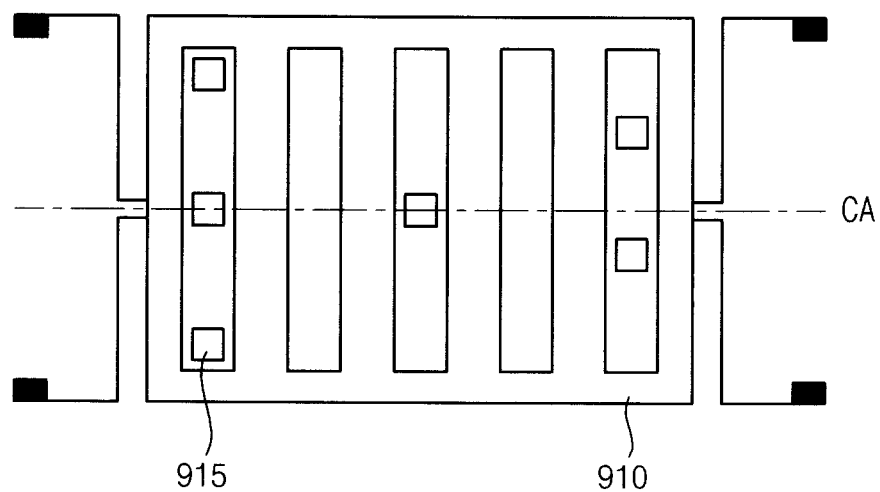

Referring to FIG. 6D, a micro shutter 910 includes a plurality of sub-concave portions 915. The sub-concave portions 915 are disposed at both sides of the micro shutter 910. Depths of the sub-concave portions 915 are different from each other. Each of the sub-concave portions 915 has, for example, a cone shape or a quadrangular pyramid shape.

Figure 7A:
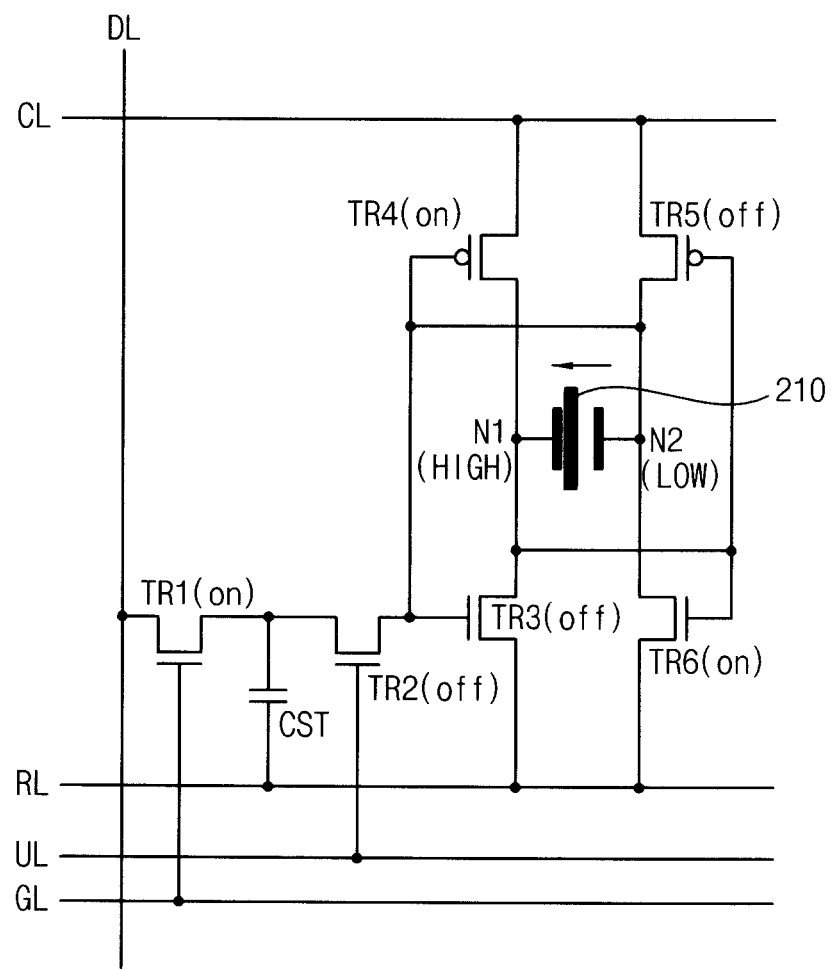
FIGS. 7A and 7B are conceptual diagrams to explain opening of a shutter part of FIG. 1.
Figure 7B:
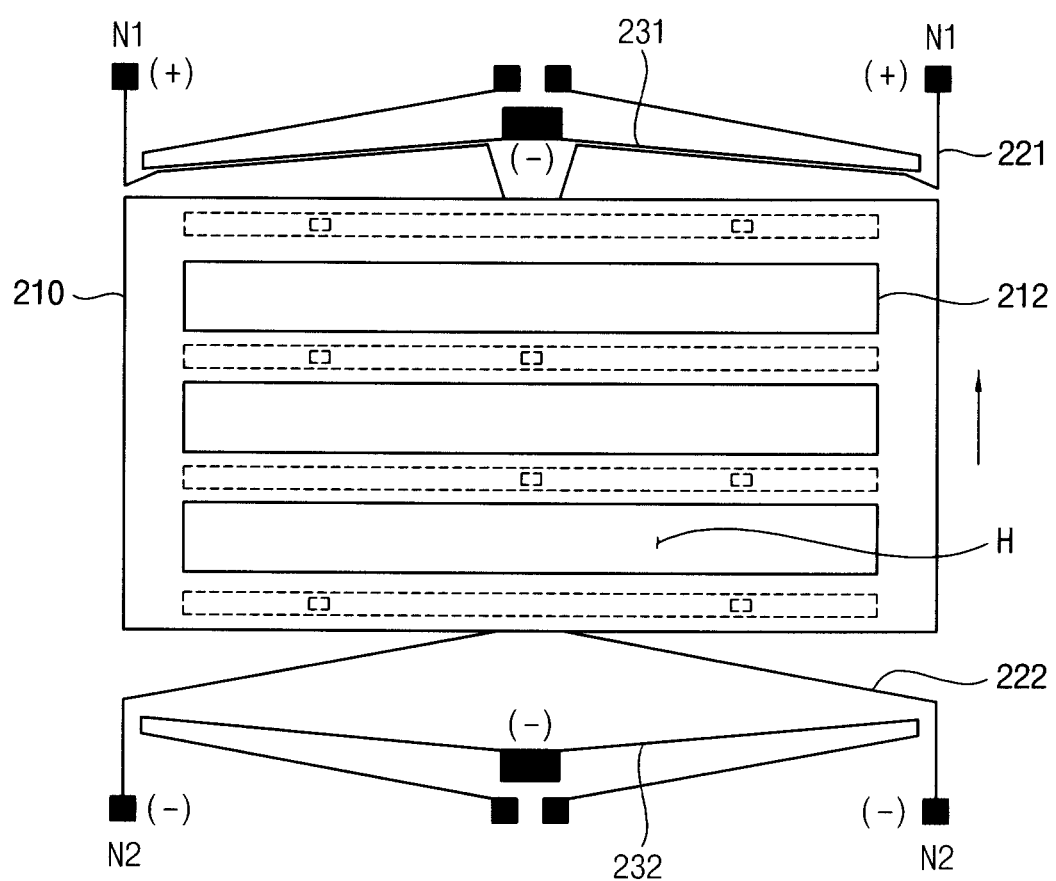

FIGS. 7A and 7B are conceptual diagrams to explain opening of a shutter part of FIG. 1.

Referring to FIGS. 7A and 7B, in a first period, a first data signal having a relatively high level is applied to the data line DL, and a gate signal having the relatively high level is applied to the gate line GL. In addition, a control signal having the relatively high level is applied to the control line CL, and an up-data signal having a relatively low level is applied to the up-data line UL. In addition, a reference signal having the relatively low level is applied to the reference line RL.

As a result, the first transistor TR1 is turned on, the first data signal is charged at the storage capacitor CST. The second transistor TR2 is turned off. As the second transistor TR2 is turned off, a signal having the relatively low level is applied to the third transistor TR3 and the fourth transistor TR4. As a result, the third transistor TR3 is turned off, and the fourth transistor TR4 is turned on. As the fourth transistor TR4 is turned on, the control signal having the relatively high level is applied to the first node N1, the fifth transistor TR5 and the sixth transistor TR6. The fifth transistor TR5 is turned off, and the sixth transistor TR6 is turned on. As the sixth transistor TR6 is turned on, the reference signal applied to the reference line RL and having the relatively low level is applied to the second node N2. A signal having the relatively high level is applied at the first node N1. A signal having the relatively low level is applied at the second node N2.

The first node N1 is electrically connected to a first driving electrode 221 of the micro shutter 210. The second node N2 is electrically connected to a second driving electrode 222 of the micro shutter 210. Alternatively, the reference voltage having the relatively low level is applied to the first and second reference electrodes 231 and 232. Due to an electrostatic force, the first driving electrode 221 and the first reference electrode 231 pull each other. The second driving electrode 222 and the second reference electrode 232 push each other. The micro shutter 210 is moved toward the first reference electrode 231, so that the opening 212 overlaps with the transmitting hole H of the second display substrate 400.

As a result, the light passes through the micro shutter 210, and a pixel defined by the micro shutter 210 displays an image having a relatively high gray scale.

Figure 8A:
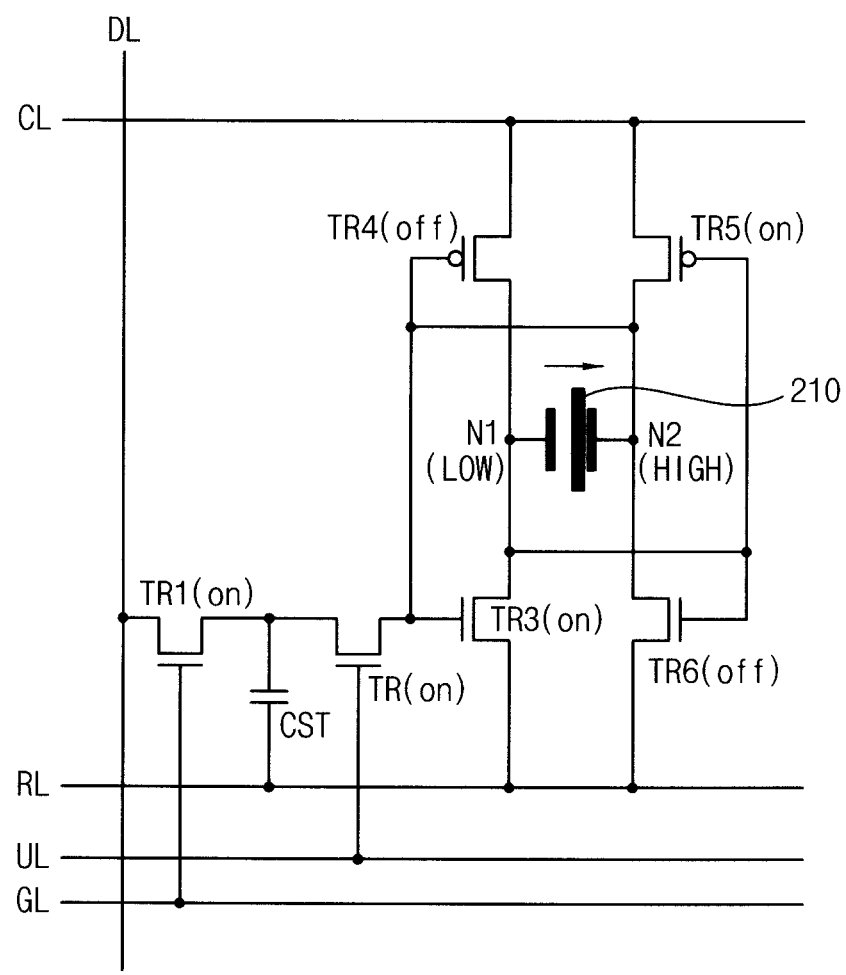
FIGS. 8A and 8B are conceptual diagrams to explain a closing of the shutter part of FIG. 1.
Figure 8B:
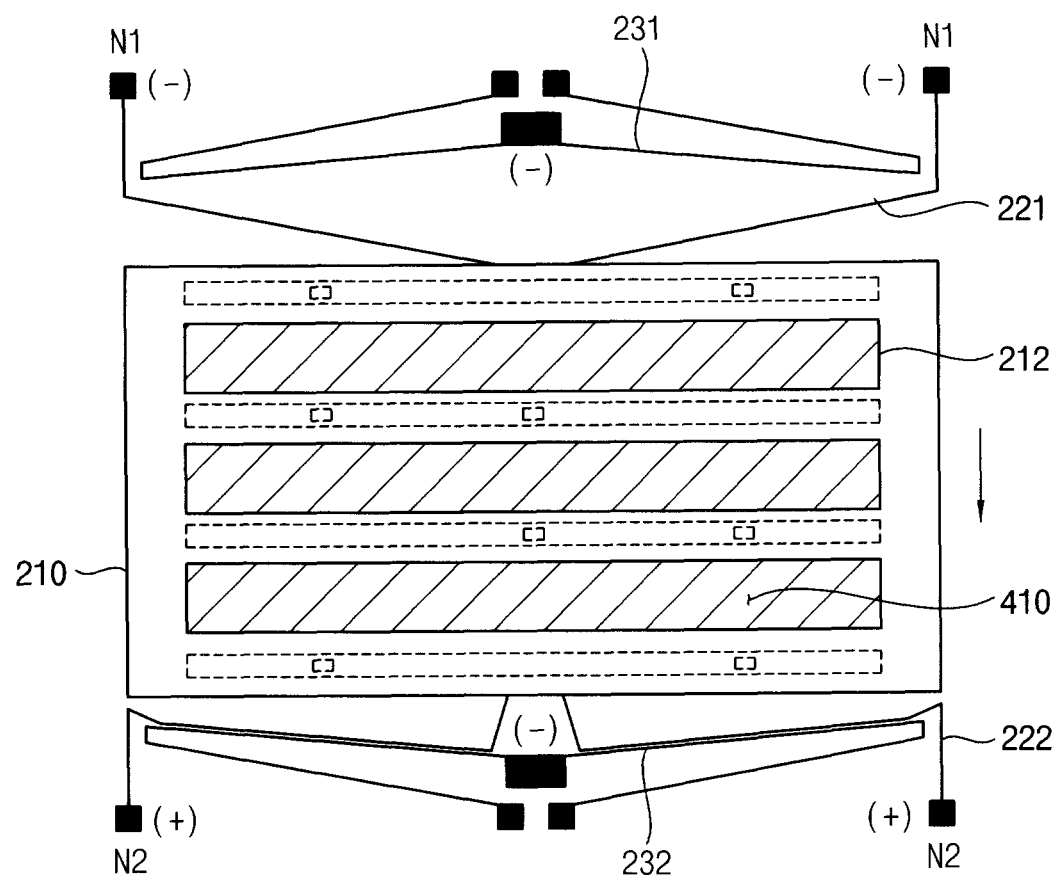

FIGS. 8A and 8B are conceptual diagrams to explain a closing of the shutter part of FIG. 1.

Referring to FIGS. 8A and 8B, in a second period, a second data signal having the relatively low level is applied to the data line, and a gate signal having the relatively high level is applied to the gate line GL. In addition, a control signal having the relatively high level is applied to the control line CL, and an up-data signal having a relatively high level is applied to the up-data line UL. In addition, a reference signal having the relatively low level is applied to the reference line RL.

As a result, the first transistor TR1 is turned on, and the second data signal is charged at the storage capacitor CST. The second transistor TR2 is turned on. As the second transistor TR2 is turned on, the third transistor TR3 is turned on and the fourth transistor TR4 is turned off. As the fourth transistor TR4 is turned off, a signal having the relatively low level is applied to the first node N1, the fifth transistor TR5 and the sixth transistor TR6. The fifth transistor TR5 is turned on, and the sixth transistor TR6 is turned off. As the fifth transistor TR5 is turned on, the control signal, which is applied to the control line CL and having the relatively high level, is applied to the second node N2. A signal having a relatively low level is applied to the first node N1, and a signal having relatively high level is applied to the second node N2.

Due to the electrostatic force, the first driving electrode 221 and the first reference electrode 231 push each other. The second driving electrode 222 and the second reference electrode 232 pull each other. The micro shutter 210 moves toward the second reference electrode 232, so that the opening 212 overlaps with the reflecting layer 410 of the second display substrate 400.

As a result, the light is blocked by the micro shutter 210, and a pixel defined by the micro shutter 210 displays an image having a relatively low gray scale.

According to example embodiments of the present invention, a plurality of sub-concave portions have a depth different each other on the micro shutter 210, so that a static friction between the base substrate and the micro shutter 210 spaced apart and floated from the base substrate may be decreased.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the embodiments of the present invention as defined in the claims.

What is claimed is:

1. A display substrate comprising:
    a base substrate;
    a micro shutter comprising a flat portion having at least one opening, a main concave portion adjacent to the opening and extending in from the flat portion to a first depth, and at least one sub-concave portion extending in from a bottom surface of the main concave portion to a second depth;
    a first driving electrode connected to a first side of the micro shutter;
    a second driving electrode connected to a second side of the micro shutter, the second side positioned opposite to the first side; and a plurality of anchors fixing the first and second driving electrodes on the base substrate.

2. The display substrate of claim 1, further comprising
a first reference electrode spaced apart from the first driving electrode, and fixed on the base substrate by at least one of the anchors; and
a second reference electrode spaced apart from the second driving electrode, and fixed on the base substrate by at least one of the anchors.

3. The display substrate of claim 1, wherein the micro shutter comprises a plurality of sub-concave portions, and depths of the sub-concave portions from the bottom surface of the main concave portion are different from each other.

4. The display substrate of claim 3, wherein the sub-concave portions are symmetrically formed with respect to a central axis of the micro shutter.

5. The display substrate of claim 3, wherein the sub-concave portions are asymmetrically formed with respect to a central axis of the micro shutter.

6. The display substrate of claim 3, wherein the sub-concave portions are formed adjacent to a central axis of the micro shutter.

7. The display substrate of claim 3, wherein the sub-concave portions are formed at the first and second sides of the micro shutter.

8. The display substrate of claim 1, wherein the sub-concave portion has a cone shape or a quadrangular pyramid shape.

9. The display substrate of claim 1, further comprising a circuit part disposed on the base substrate, and providing a driving signal to the first and second driving electrodes.

10. The display substrate of claim 9, wherein the circuit part comprises a storage capacitor comprising at least one electrode, and the electrode is formed corresponding to an area where the micro shutter is disposed and is substantially parallel with the opening.

11. A display panel comprising:
a first display substrate comprising:
a first base substrate;
a micro shutter comprising a flat portion having at least one opening, a main concave portion adjacent to the opening and extending in from the flat portion to a first depth, and at least one sub-concave portion extending in from a bottom surface of the main concave portion to a second depth;
a first driving electrode connected to a first side of the micro shutter;
a second driving electrode connected to a second side of the micro shutter, the second side positioned opposite to the first side; and
a plurality of anchors fixing the first and second driving electrodes on the base substrate;
a second display substrate comprising a second base substrate facing the first base substrate, and a reflecting layer formed on the second base substrate and having at least one transmitting hole corresponding to an area where the micro shutter is formed; and
a fluidic layer disposed between the first and second display substrates.

12. The display panel of claim 11, wherein the micro shutter comprises a plurality of sub-concave portions, and depths of the sub-concave portions extending in from the bottom surface of the main concave portion are different from each other.

13. The display panel of claim 11, further comprising a circuit part disposed on the first base substrate, and providing a driving signal to the first and second driving electrodes.

14. The display panel of claim 13, wherein the circuit part comprises a storage capacitor comprising at least one electrode, and the electrode is formed corresponding to an area where the micro shutter is disposed and is substantially parallel with the opening.

15. The display panel of claim 14, wherein the electrode of the storage capacitor overlaps with the reflecting layer.

\* \* \* \* \*